May 10, 1932. A. G. TYLER ET AL 1,857,267
APPARATUS FOR MEASURING THE FLIGHT OF A BALL
Filed Dec. 26, 1928 3 Sheets-Sheet 1
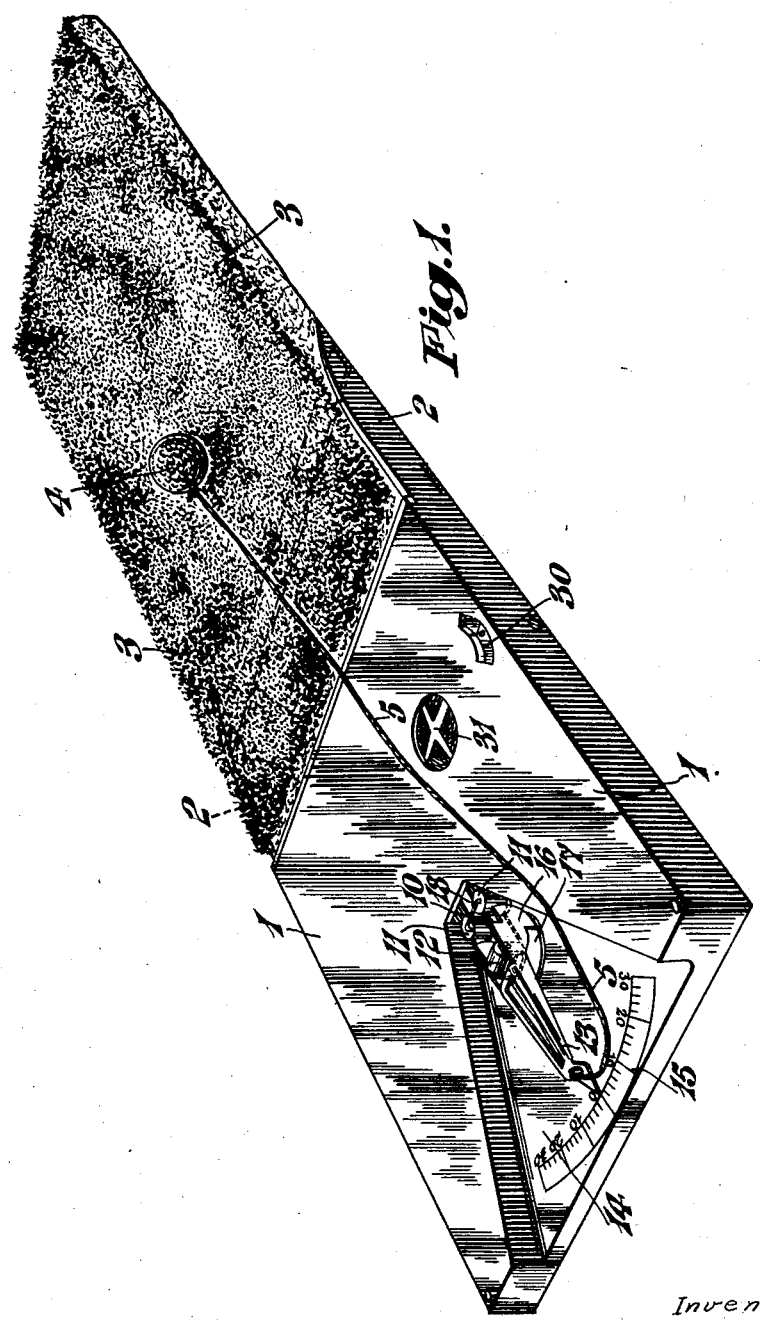
Inventors
Alfred George Tyler
Edmund Fritchaf Struckman
By J. Kaplan
Attorney

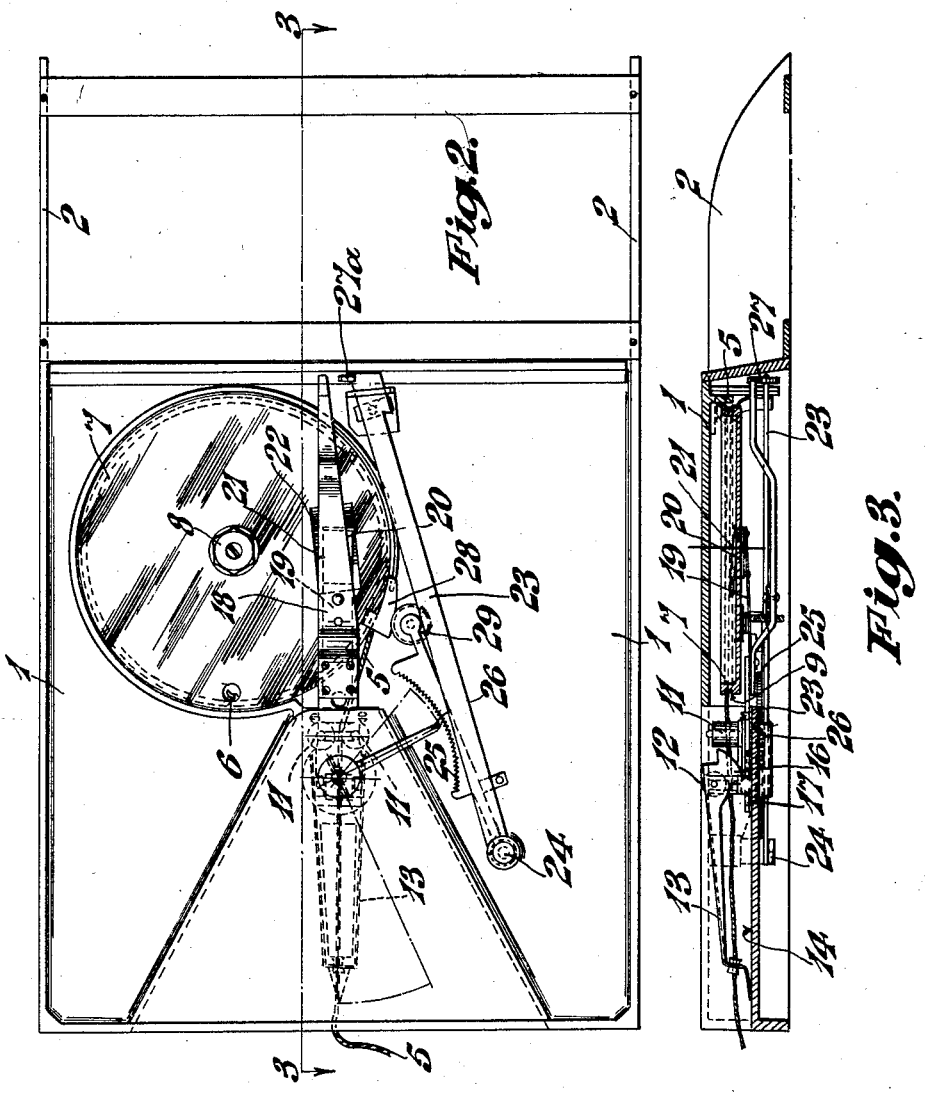

INVENTORS.
A. G. Tyler
E. F. Struckman
By J. Kaplan
Attorney

Patented May 10, 1932

1,857,267

UNITED STATES PATENT OFFICE

ALFRED GEORGE TYLER AND EDMUND FRITCHAF STRUCKMAN, OF LONDON, ENGLAND

APPARATUS FOR MEASURING THE FLIGHT OF A BALL

Application filed December 26, 1928, Serial No. 328,557, and in Great Britain March 6, 1928.

This invention relates to devices for measuring the flight of a ball of the kind which comprises a captive ball adapted to be struck by a suitable implement such as a golf club.

The object of the present invention is to provide an improved device of this character which shall be more accurate than similar devices at present known and one which may also be adapted to indicate besides the length of the flight, its direction and/or angle of elevation.

Broadly the present invention consists of a device for measuring the flight of a ball comprising a captive ball and means actuated by the captive ball when struck for giving an indication of the estimated distance, direction, and angle of loft or elevation of the flight of a similar ball when correspondingly hit.

The invention also consists of a device for measuring the flight of a ball in which the estimated distance of the flight is a measure of the resistance or pull on a cord or the like serving to connect a captive ball to the machine and the effect of such resistance or pull on an indicating means is varied in accordance with the vertical angle of flight of the captive ball when struck.

An apparatus according to one embodiment of the invention comprises a rotatable wheel or disc which is adapted to be rotated under the pull exerted by the outward movement of the captive ball when struck. The free rotation of this wheel or disc is prevented by friction means which impose a retarding effect on the disc having a predetermined relationship to the pull of the ball. By providing the wheel or disc with a suitably calibrated scale and associating with it a fixed visual or other indicator there is provided a simple means of measuring and indicating the distance a free ball would have travelled if similarly struck.

The friction means abovementioned or additional means serving a similar purpose is operated in the present embodiment to vary the retarding effect on the movement of the disc either by increasing or decreasing such effect or simply by supplying a retarding force additional to the normal.

This may be effected in practice by means comprising a pivoted guiding finger for the ball cord or the like adapted to be universally movable under the influence of and in accordance with the direction of flight of the ball. The pivotal movement of this finger in a vertical direction serves to move a friction pad or other similar means into and out of contact with the disc through the medium of a suitably shaped cam. The cam is so shaped that deviation from a predetermined normal angle or range of angles of flight imposes a retarding effect on the disc.

The abovementioned finger may be shaped or otherwise constructed to form a pointer and to have associated with it a fixed scale the arrangement being such that the angle or direction of flight is thereby indicated. Means are preferably provided for locking or holding the pointer or finger immediately following, and as a result of, the movement of the ball cord or the like, such means being released by, for example, returning the distance indicator to zero.

By means of an apparatus according to the present invention it is possible to play an indoor game of golf by marking off on a scaled chart of a course the flight of each ball as determined by our apparatus.

In order that the invention may be clearly understood and carried into effect a device forming one example of the same will now be described by aid of the accompanying drawings in which:—

Fig. 1 is a perspective view of the complete apparatus.

Fig. 2 is an underside plan view of the same with the imitation grass mat removed.

Fig. 3 is a longitudinal vertical section through the apparatus taken on the line 3—3 of Fig. 2.

Figure 4:
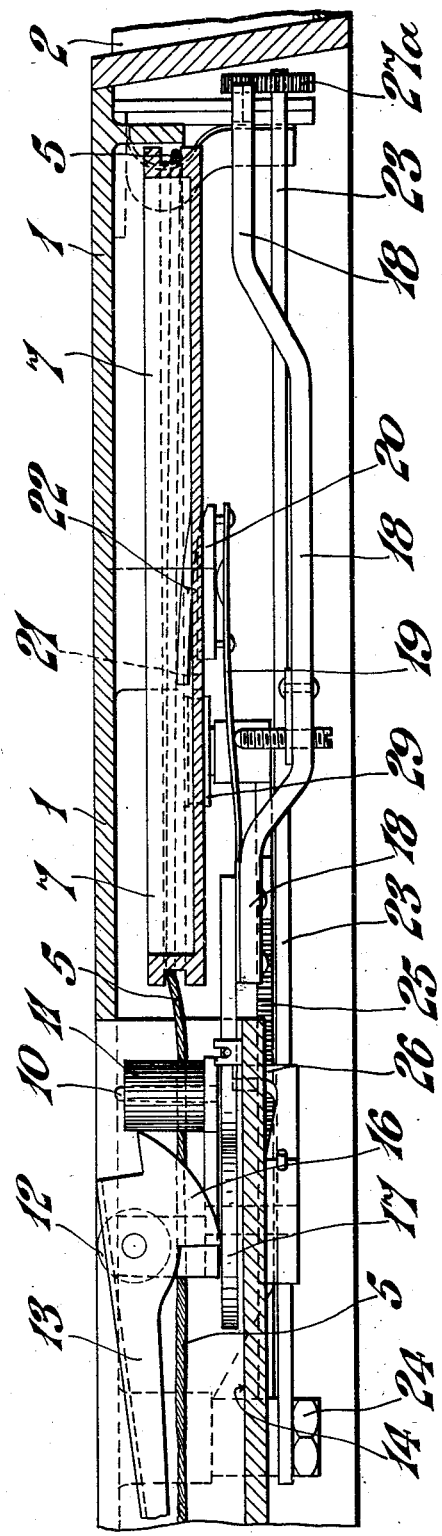
Fig. 4 is an enlarged sectional view of a portion of Figure 3.

The apparatus illustrated in the drawings is adapted to indicate the distance, direction and angle of elevation of the flight of a golf ball and it comprises a rectangular metal or other rigid casing 1 containing the indicating mechanism and a rear extension 2 for the reception of a fibre or other mat 3 which may be coloured to represent grass and on which a captive ball 4 is placed preparatory to being struck by a golf club.

The captive ball 4 which is preferably lighter in weight than a conventional golf ball is attached to the indicating mechanism by means of a cord, wire or other flexible connection 5 of suitable length and hereafter referred to as a cord.

The inner end of the cord is attached as at 6, see Fig. 2 to the periphery of a drum 7 which is mounted to turn about a vertical pivot 8 located on one side of the longitudinal central axis of the machine. The cord 5 is adapted normally to substantially encircle the drum and to reside within a groove 9 formed in its periphery. The outer end of the cord is then guided out through an aperture 10 in the casing by being passed between a pair of vertically disposed idle rollers 11 carried by the casing 1 and beneath a horizontal roller 12 carried by a finger or pointer 13. This finger which is located in a sunken recess 14 in the forward part of the casing 1 is adapted to move about a vertical pivot across a horizontal scale 15 which is marked in degrees for the purpose of indicating the direction of flight of the captive ball when struck.

The movement of the finger 13 is controlled by the cord 5 and such movement in turn when in a vertical direction serves to impose a variable retarding effect on the free movement of the drum 7. This is effected in the example illustrated, by means of cam surfaces 16 forming part of or carried by the inner end of the finger 13. These cam surfaces bear against a horizontal plate 17 which is attached to one end of a fulcrumed lever 18.

Attached to the lever 18 by means of a blade spring 19 is a friction pad 20 which bears against the underside of the drum 7 thus acting as a brake to impose a resistance to the free rotation of such drum. The pressure with which this pad bears against the drum 7 varies with the vertical movement of the finger 13. The cam surfaces are so shaped that the abovementioned pressure of the pad against the drum and consequently the resistance to the movement of the drum is a measure of the angle of loft or elevation of flight of the captive ball.

As will be seen, the drum is caused to turn by the pull exerted by the flight of the captive ball when struck through the medium of the cord 5. To prevent the cord from breaking or being disconnected from the pull by any sudden and undue retarding influence the initial movement of the drum is unrestrained by the braking pad 20. To accomplish this the underside of the drum is formed with a recess 21 having an inclined surface 22 at one end. This recess is so positioned as to accommodate the pad 20 when the drum is in the normal or zero position and is of such a depth as will permit the pad to be only lightly in contact with the drum. As the drum commences to turn the pad will be gradually brought into action by riding up the inclined surface 22.

In the example illustrated means are provided for locking the finger 13 in the position in which it is placed by the cord 5 when such cord is pulled taut by movement of the captive ball when struck for the purpose of enabling the direction and elevation of the flight to be ascertained. The means illustrated comprises a lever 23 which is pivoted by one end as at 24, to the underside of the casing 1. Carried by this lever and intermediate its length is an arcuate plate with a series of ratchet teeth 25 formed on its outer periphery. These teeth are arranged to form an arc having as its centre of radius the axis of the vertical pivot of the finger 13 whereby the teeth may serve to engage and retain a finger 26 and through it by suitable attachment the finger 13 throughout the whole range of its angular movement in a horizontal plane. At the opposite free end of the lever 23 is a further series of ratchet teeth 27 formed in the face of a block 27a which teeth are adapted on occasion, to engage and hold the adjacent extremity of the lever 18. Normally the lever 23 is displaced to a position where its associated sets of ratchet teeth are out of engagement with the finger 26 and the lever 18 respectively. This displacement is effected by means of a cam 28 on the periphery of the drum 7 which, when the drum is in the zero position engages a roller 29 on the lever 23. When the drum commences to rotate under the pull of the cord 5 this cam is moved clear of the roller 29 and by means of a suitable spring action the lever 23 moves inwards about its pivot so bringing the sets of ratchet teeth into engagement with the finger 26, and the extremity of the lever 18. As a consequence the finger 13 is held in the position to which it is moved by the tightening of the cord 5.

An indication of the estimated length of the flight of a ball is given by means of numerals marked at intervals around the upper surface of the drum 7 and visible through an opening or window 30 in the top of the casing 1. The drum 7 is returned to zero after each hit by rotating a member 31, see Fig. 1, attached to or forming an extension of the drum's pivot 8. The return of the drum to its zero position automatically releases the finger 13.

Claims.

1. In an apparatus of the kind described, a support, a drum on said support, a ball, a strand connected to the ball and wound on said drum, an arm pivoted for movement in horizontal and vertical directions and having guides through which the strand passes, and means to indicate the horizontal and vertical movements of said arm upon the ball being struck, and a braking mechanism for said drum actuated by the vertical swinging movement of said arm.

2. In an apparatus of the kind described, a support, a drum on said support, a ball, a strand connected to the ball and wound on said drum, an arm pivoted for movement in horizontal and vertical directions and having guides through which the strand passes, means to indicate the horizontal and vertical movements of said arm upon the ball being struck, a braking mechanism for said drum actuated by the vertical swinging movement of said arm, said drum having means to indicate the extent of unwinding of the strand.

3. In an apparatus of the kind described, a support, a drum on said support, a ball, a strand connected to the ball and wound on said drum, an arm pivoted for movement in horizontal and vertical directions and having guides through which the strand passes, means to indicate the horizontal and vertical movements of said arm upon the ball being struck, a braking mechanism for said drum actuated by the vertical swinging movement of said arm for effecting braking of the drum in proportion to the extent of said vertical swinging movement, said drum having means to indicate the extent of unwinding of the strand.

4. In an apparatus of the kind described, a support, a drum on said support, a ball, a strand connected to the ball and wound on said drum, an arm pivoted for movement in horizontal and vertical directions and having guides through which the strand passes, means for latching the arm in horizontal and vertical displacement, and means on the drum for engaging the latching means upon the strand being wound on the drum, said last means moving the latching means to inoperative position.

5. In an apparatus of the kind described, a support, a drum on said support, a ball, a strand connected to the ball and wound on said drum, an arm pivoted for movement in horizontal and vertical directions and having guides through which the strand passes, means for latching the arm in horizontal and vertical displacement, means on the drum for engaging the latching means upon the strand being wound on the drum, said last means moving the latching means to inoperative position and a braking mechanism for said drum actuated by the vertical swinging movement of said arm.

In testimony whereof we have affixed our signatures.

ALFRED GEORGE TYLER.
EDMUND FRITCHAF STRUCKMAN.